Figure 1A:
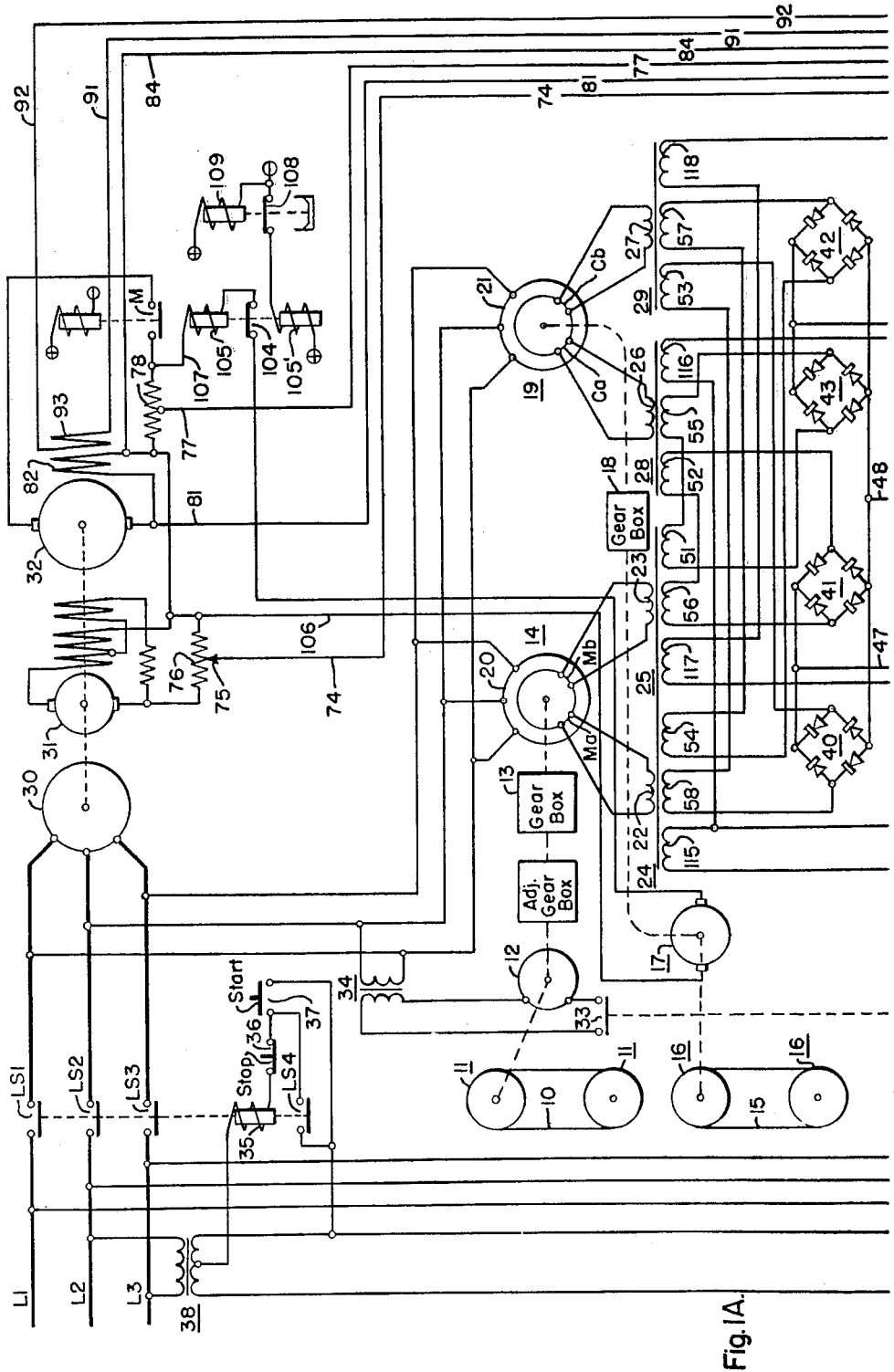

Fig. 2A.
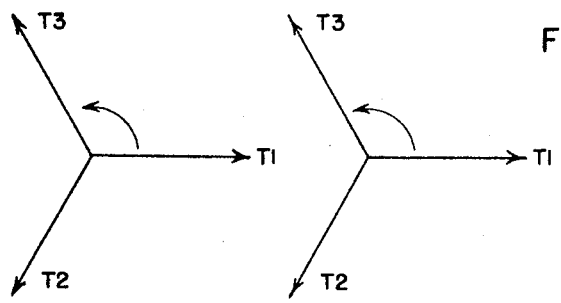
Fig. 2B.
Fig. 3A.
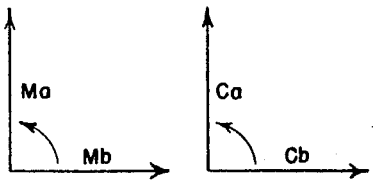
Fig. 3B.
Fig. 4A.
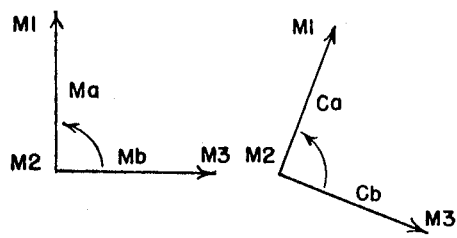
Fig. 4B.
Fig. 5A.
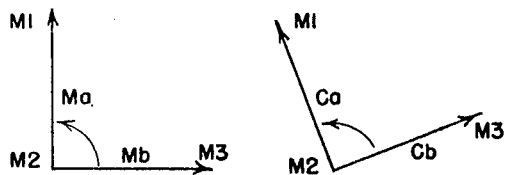
Fig. 5B.
Fig. 6A.
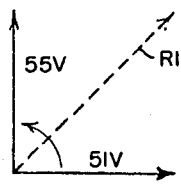
Fig. 6B.
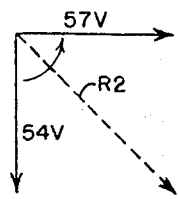
Fig. 6E.
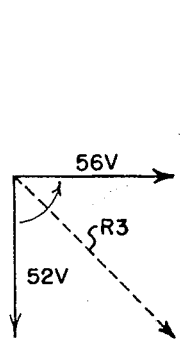
Fig. 6C.
Fig. 6D.
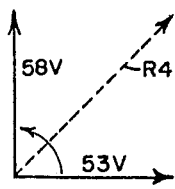

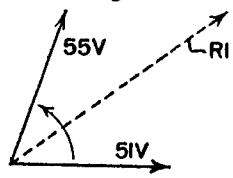
Fig. 7A.
Fig. 7B.
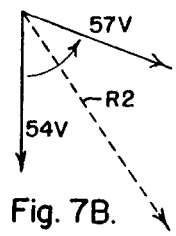
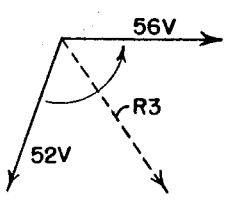
Fig. 7C.
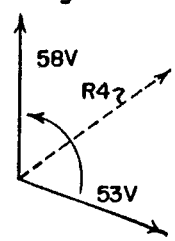
Fig. 7D.
Fig. 7E.
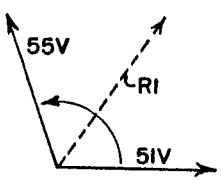
Fig. 8A.
Fig. 8B.
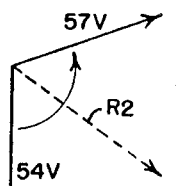
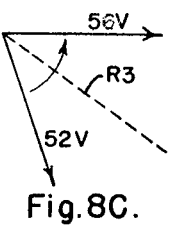
Fig. 8C.
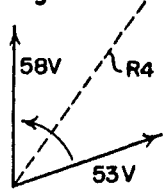
Fig. 8D.
Fig. 8E.
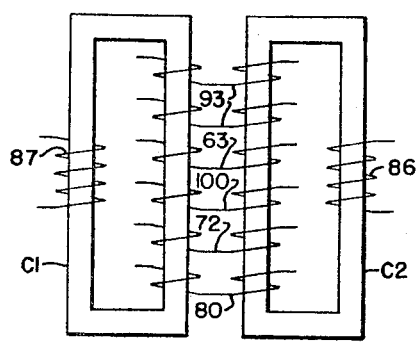
Fig. 9.

United States Patent Office 3,086,153
Patented Apr. 16, 1963

3,086,153
SYNCHRONIZED CONVEYOR CONTROL
Gerald E. Mathias, Clarence Township, Erie County, N.Y., and Robert W. Egglestone, West Hartford, Conn., assignors to Westinghouse Electric Corporation, East Pittsburgh, Pa., a corporation of Pennsylvania
Filed July 5, 1957, Ser. No. 670,318
8 Claims. (Cl. 318—71)

This invention relates to control systems for synchronizing the movements of conveyors.

The body assembly plants of the automobile manufacturing industry used synchronized conveyors which must be maintained in close relation positions with respect to each other so that the automatic transfer of bodies from one conveyor to another can properly be affected.

Prior conveyor synchronizing systems have been electromechanical in nature, more mechanical than electrical. They have used single phase synchro units to establish desired positions and to measure actual positions. In such a prior system, a differential synchro unit indicates by mechanical rotation of its shaft, the difference in angle between actual and desired conveyor positions. Driven from the differential unit is a cam switch with contacts set at various degrees of error which actuate a motor operated rheostat to initiate proper corrective action.

Our invention uses a polyphase synchro reference unit which may be geared to a reference conveyor. Another duplicate synchro unit geared to a conveyor to be controlled, one revolution per job length, provides the signal for actual position. Secondary voltages from the two units are compared vectorially to produce a voltage which is proportional to error position. The error voltage is applied to a magnetic amplifier position regulator which acts to adjust the speed of rotation of the motor driving the controlled conveyor for bringing it back in synchronism.

Our control system has the advantage of being static, having no contacts or other mechanically operated circuit elements which require maintenance. Another advantage is that our control system is proportional instead of one having a dead zone as in prior systems. Still another advantage of our control system is that a synchroscope may be used for remote indications of relative conveyor positions.

A conveyor synchronizing control system should not speed the controlled conveyor up more than 5 to 10 percent above normal operating speed since assembly operations, some of which are automatic, cannot tolerate such an increase in speed. Another advantage of our control system is that an error limit circuit is used to limit the maximum signal that can be appled to the position signal winding of the magnetic amplifier.

An object of this invention is to improve control systems for synchronizing conveyors.

Another object of this invention is to synchronize the movements of conveyors by means of static control systems.

Another object of this invention is to control the movement of a conveyor by connecting the conveyor to a synchro unit which produces voltages indicative of conveyor position, by comparing the voltages vectorially with voltages from a reference synchro to produce error voltages which are proportional to error positions of the conveyor, and by using the error voltages to adjust the speed of movement of the conveyor.

Another object of this invention is to provide in a control system for synchronizing conveyors, an error limit circuit which limits the degree a controlled conveyor can be speeded up.

Figure 1B:
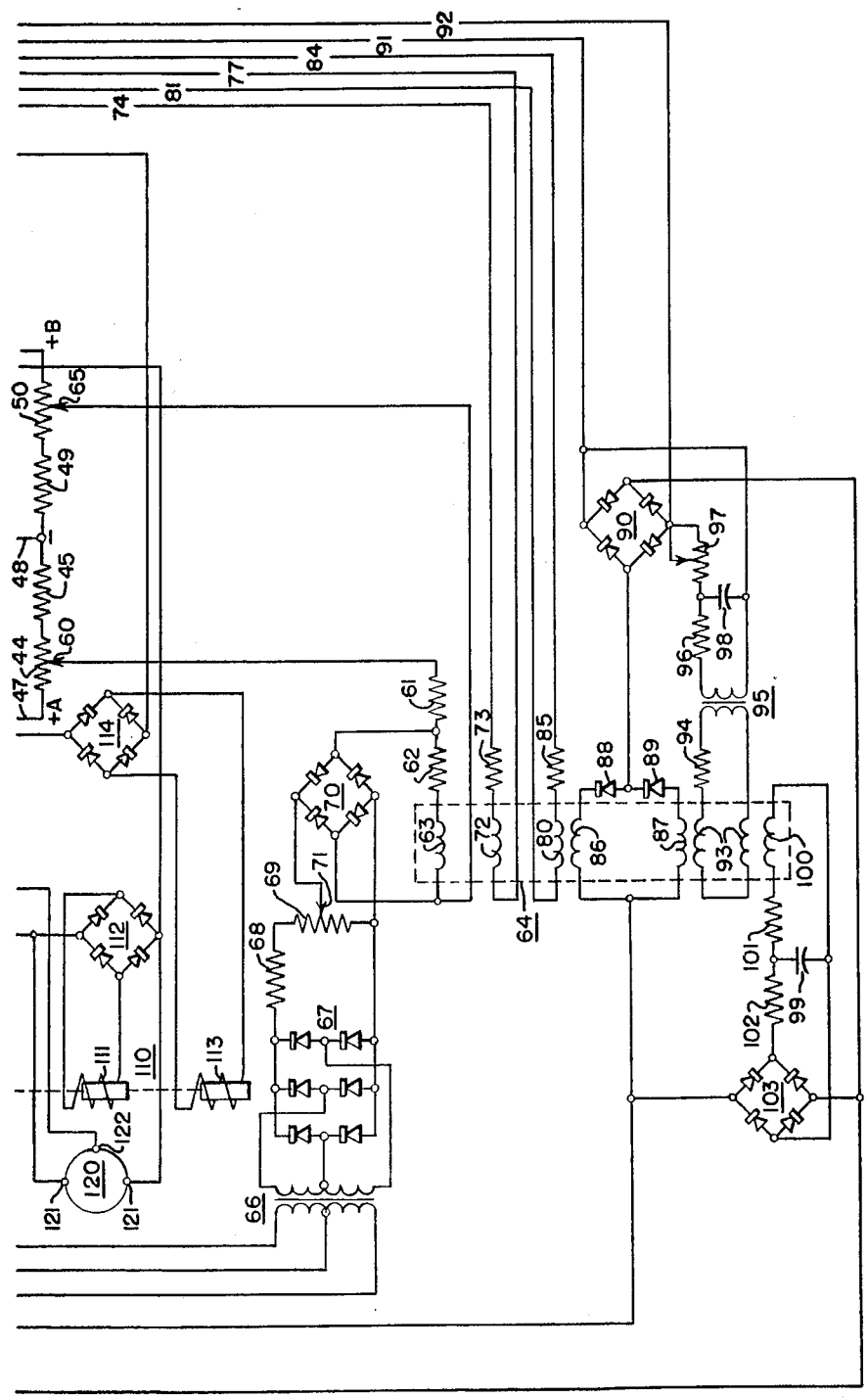

Our invention will now be described with reference to the annexed drawings, of which:

FIGURES 1A and 1B are diagrams of a control system embodying this invention;
FIG. 2A is a vector diagram showing the voltages in the primary windings of the reference synchro;
FIG. 2B is a vector diagram showing the voltages in the primary windings of the synchro of the controlled conveyor;
FIGS. 3A, 4A and 5A are similar vector diagrams showing the voltages in the secondary windings of the reference synchro;
FIG. 3B is a vector diagram showing the voltage in the secondary windings of the synchro of the controlled conveyor when the controlled conveyor is at its correct position;
FIG. 4B is a vector diagram showing the voltage in the secondary windings of the synchro of the controlled conveyor when the controlled conveyor is behind its correct position eleven inches;
FIG. 5B is a vector diagram showing the voltages in the secondary windings of the synchro of the controlled conveyor when the controlled conveyor is eleven inches ahead of its correct position;
FIGS. 6A, 6B, 6C and 6D are vector diagrams showing the added vector voltages in the eight windings coupled to the secondary winding of the control syncho and the synchro of the controlled conveyor, when the controlled conveyor is in its correct position;
FIG. 6E is a chart showing the resultant voltages from the two synchros when the controlled conveyor is in its correct position;
FIGS. 7A, 7B, 7C and 7D are vector diagrams showing the added vector voltages in the eight windings coupled to the secondary winding of the control synchro and the synchro of the controlled conveyor, when the controlled conveyor is eleven inches behind its correct position;
FIG. 7E is a chart carrying the resultant voltages from the two synchros when the controlled conveyor is eleven inches behind its correct position;
FIGS. 8A, 8B, 8C and 8D are vector diagrams showing the added vector voltages in the eight windings coupled to the secondary winding of the control synchro and the synchro of the controlled conveyor, when the controlled conveyor is eleven inches ahead of its correct position;
FIG. 8E is a chart showing the resultant voltages from the two synchros when the controlled conveyor is eleven inches ahead of its correct position, and
FIG. 9 is a diagrammatic view showing the two cores of the magnetic amplifier position regulator of FIG. 1 and the windings thereon.

Referring now to FIG. 1 of the drawings, a master conveyor 10 rotates over two end rollers 11, one of which is driven by an electric motor 12. The motor 12 also drives through a gear box 13, the rotor of a master synchro 14, one revolution per job length.

A controlled conveyor 15 rotates over two end rollers 16, one of which is driven by a D.C. motor 17. The motor 17 also drives through a gear box 18, the rotor of a synchro 19 which is similar to the synchro 14. The rotor of the synchro 19 is rotated one revolution per job length. The movement of the conveyor 15 is to be synchronized with that of the conveyor 10.

The synchros 14 and 19 are alternating current units commonly used for the transmission of angular-position data, and are described in detail in Chapter V of Principles of Radar, Third Edition, published by McGraw-Hill. In the illustrated embodiment of this invention, they have stators with three-phase primary windings, and rotors with two-phase secondary windings. The synchro 14 has stator windings 20, and the synchro 19 has stator windings 21 connected through switches LS1, LS2 and LS3 to three-phase supply lines L1, L2 and L3. The synchro 14 has rotor windings Ma and Mb which are connected to primary windings 22 and 23 of transformers 24 and 25, respectively. The synchro 19 has rotor windings Ca and Cb which are connected to primary windings 26 and 27 of transformers 28 and 29, respectively. The transformers 24, 25, 28 and 29 have secondary windings which provide voltages which are added vectorially to provide error voltages as will be described later.

A motor-generator set consisting of an A.C. motor 30, a D.C. exciter 31, and a D.C. generator 32, on a common shaft, is used to drive the conveyor motor 17. The motor 30 is connected through the switches LS1, LS2, LS3 to the supply lines L1, L2 and L3. The field excitation of the generator 32 is adjusted by use of the error voltages to control the speed of the motor 17 and the position of the conveyor 15 as will be described.

The master conveyor motor 12 is connected through relay contacts 33 to the secondary winding of a transformer 34, the primary winding of which is connected to supply lines L1 and L2 when the switches LS1 and LS2 and LS3 are closed.

The switches LS1, LS2 and LS3 and switches LS4 are adapted to be closed by solenoid 35, the energizing winding of which is connected in series with Stop switch 36 and Start switch 37 to one end and to a mid-tap of the secondary winding of transformer 38, the primary winding of which is connected to supply lines L2 and L3. Switch LS4 is connected across the Start switch 37 in a holding circuit for maintaining the system energized when the Start switch, which may be a push button, is released.

Bridge-connected rectifiers 40, 41, 42 and 43 have output terminals connected in series. Resistors 44 and 45 are connected in series to the junction connection of the rectifier 40 and rectifier 41 through wire 47 and to the junction connection of the rectifiers 41 and 43 through wire 48. Resistors 49 and 50 are connected in series and through wire 48 to the junction connection of the rectifiers 41 and 43, and through a similar wire to the junction connection of the rectifiers 42 and 43. The rectifiers 40, 41, 42 and 43 are connected to the secondary windings of the transformers 24, 25, 26 and 27 as follows: The input terminals of the rectifier 40 are connected to series-connected transformer secondary windings 53 and 58. The input terminals of rectifier 41 are connected to series-connected transformer secondary windings 52 and 56. The input terminals of the rectifier 42 are connected to series-connected transformer secondary windings 54 and 57. The input terminals of the rectifier 43 are connected to series-connected transformer secondary windings 51 and 55.

The input to the rectifiers 40–43 can be described as push-pull, two-phase.

The resistor 44 has a slider 60 connected in series with resistors 61 and 62 to one end of position winding 63 of magnetic amplifier position regulator 64, the other end of the winding 63 being connected to slider 65 of the resistor 50.

Transformer 66 has primary windings connected to the supply lines L1, L2 and L3, and has secondary windings connected to rectifiers 67, the D.C. output of which is applied across resistors 68 and 69 connected in series. The resistor 69 connected at one end to one input terminal of a bridge-connected rectifier 70 has a slider 71 connected to the other input terminal of the rectifier 70. The output terminals of the rectifier 70 are connected across series-connected winding 63 and resistor 62. The rectifier 70 supplies a D.C. reference voltage for limiting the maximum signal that can be impressed from the resistors 44, 45, 49 and 50 upon the position winding 63.

The position regulator 64 has a voltage winding 72 connected at one end through resistor 73 and wire 74 to slider 75 of resistor 76 which is connected across the output of the exciter 31. The other end of the voltage winding 72 is connected through wire 77 to a tap on voltage divider 78 which is connected across the output of the generator 32.

The position regulator 64 has an IR component winding 80 which is connected through wire 81 to the junction connection of one end of series field winding 82 to one brush of the generator 32, and connected through wire 84 to the other end of the series field winding 82.

The position regulator 64 has power windings 86 and 87 connected together at one end to one end of the secondary winding of the transformer 38. The other ends of the windings 86 and 87 are connected in series through oppositely poled diodes 88 and 89. The junction connection of the diodes 88 and 89 is connected to one input terminal of bridge-connected rectifier 90, the other input terminal of which is connected to the other end of the secondary winding of the transformer 38. The output terminals of the rectifier 90 are connected through wires 91 and 92 across main field winding 93 of the generator 32 for energizing this field winding.

The position regulator 64 has damping windings 93 connected in series with each other and in series with resistor 94 to the secondary winding of transformer 95, the primary winding of which is connected in series with resistors 96 and 97 to the wires 91 and 92 which are connected to the output terminals of the rectifier 90. A capacitor 98 is connected to the junction connection of the resistors 96 and 97 and to the secondary winding of the transformer 95.

The position regulator 64 has a bias winding 100 connected in series with resistors 101 and 102 to the output terminals of the bridge-connected rectifier 103, the input terminals of which are connected to the secondary winding of the transformer 38. A capacitor 99 is connected to the junction connection of the resistors 101 and 102 and to the opposite output terminal of the rectifier 103.

The motor 17 of the controlled conveyor 15 is connected to the output terminals of the generator 32 through normally closed contacts 104 of instantaneous overload relay 105, and wires 106 and 107. Normally closed contacts 108 of time limit relay 109 close holding contacts 104 closed by energization of coil 105'. The relay 109 is a time limit relay energized at starting but adjusted so as not to open its contacts 108 for two to five seconds after the system goes into operation. After the two to five second period, the relay 109 opens its contacts 108, leaving the upper portion of relay 105 in control. This permits the larger-than-normal current required for acceleration and the limitation of the load current after starting. The reason for this is that the relay 105 is set very close to running load requirements so that any jam on the conveyor will be detected before damage occurs. The relay 109 prevents the relay 105 from stopping the conveyor when it is first started.

It is desirable for the master clock to be permitted to run ahead when the controlled conveyor is momentarily stopped. However, if the controlled conveyor is stopped for a sufficient period of time, one-half job length for example, the master clock must be stopped also. Relay 110 is provided for stopping the master clock motor 12 under this condition. It has a coil 111 connected across the output terminals of bridge-rectifier 112, and has another coil 113 connected across the output terminals of bridge rectifier 114. The input terminals of the rectifier 112 are connected to series-connected transformer secondary windings 115 and 116 of the transformers 24 and 28, respectively. The input terminals of the rectifier 114 are connected to the series-connected transformer secondary windings 117 and 118 of the transformers 25 and 29.

A synchroscope 120 has terminals 121 connected across the series-connected windings 115 and 116, and has a terminal 122 connected to the junction connection of the windings 115 and 116. The synchroscope may be used for remote indication of error of the controlled conveyor position.

*Operation*

In operation, the Start switch 37 is closed, causing the solenoid 35 to close the switches LS1, LS2, LS3 and LS4, connecting the motor 30 of the motor-generator-set to the power lines, and closing a holding circuit around the Start switch. The generator 32, driven by the motor 30, supplies current to the motor 17 of the controlled conveyor 15. The rotor of the synchro 19 is rotated through the gear box 18 by the motor 17.

The motor 12 of the master or control conveyor 10 is energized through the relay contacts 33 and the transformer 34 from the power lines. The motor 12 drives through the gear box 13, the rotor of the synchro 14.

The three-phase voltages of the primary or stator windings 20 and 21 of the synchros 14 and 19, respectively, are shown by FIGS. 2A and 2B, respectively. Since excited by a common three-phase supply, they are similar in degree and position. The voltages in the secondary or rotor windings $Ma$, $Mb$ and $Ca$ and $Cb$ are induced by the rotating amplifier fields established by the primary windings. The phase relationship between corresponding secondary windings depends upon the rotor positions of the two synchros.

FIGS. 3A and 3B show the secondary voltage vectors when the two rotors are in the same angular position (in synchronization). The conveyor synchro 19 is geared to turn exactly one revolution per job length. On this basis, FIGS. 4A and 4B show the secondary voltage vector relationship when the controlled conveyor 15 is eleven inches behind the master conveyor 10.

FIGS. 5A and 5B show the secondary voltage vector relationship when the controlled conveyor is eleven inches ahead of the master conveyor.

Vector voltage addition is used to procure an electrical signal which indicates the relative position of the controlled conveyor with respect to the reference position. The secondary winding $Ma$ of the master synchro 14 is connected to the primary winding 22 of the transformer 24 which has the secondary windings 58 and 54 which provide a pair of the vector voltages to be added. The secondary winding $Mb$ of the synchro 14 is connected to the primary winding 23 of the transformer 25, which has the secondary windings 51 and 56 which provide a second pair of the vector voltages to be added. The secondary winding $Ca$ of the controlled synchro 19 is connected to the primary winding 26 of the transformer 28, which has the secondary windings 52 and 55 which provide a third pair of the vector voltages to be added. The secondary winding $Cb$ of the controlled synchro is connected to the primary winding 27 of the transformer 29, which has the secondary windings 53 and 57 which provide the fourth pair of vector voltages to be added. FIGS. 6A—6D, 7A—7D and 8A—8D show these vector voltages, they being identified by the same reference characters as the transformer secondary windings in which they are produced but with the suffixes "V" added.

The pairs of vector voltages are added separately, and provide four resultant voltages R1, R2, R3 and R4.

FIGS. 6A—6D show the vector and resultant voltages when the conveyors are synchronized. FIG 6E shows that the two sets of resultant voltages have the same magnitude at this time so that there is zero error signal.

FIGS. 7A—7D show the vectors and resultant voltages when the controlled conveyor is eleven inches behind its reference position. The two sets of resultant voltages are different in magnitude in one direction, and FIG. 7E shows the difference, and the error signal.

FIGS. 8A—8D show the vectors and resultant voltages when the controlled conveyor is eleven inches ahead of the reference position. The two sets of resultant voltages are different in magnitude in the other direction, and FIG. 8E shows the difference and the error signal.

The rectifiers 40 and 41 provide a two-phase, full-wave rectified signal between plus A and minus for one-half of a push-pull correction signal. The rectifiers 42 and 43 provide a two-phase full-wave rectifier signal for the other half of the push-pull correction signal between plus B and minus. (Plus A is shown at the left end of resistor 44, and plus B is shown at the right end of the resistor 50, of FIG. 1. Minus is at the junction of resistors 45 and 49.)

As shown by FIGS. 7A—7C when the controlled conveyor is behind, the vector resultants R1 and R2 are much larger than are the vectors R3 and R4. The rectified voltage at plus A to minus is proportional to the R1 and R2, and the rectified voltage at plus B to minus is proportional to R3 and R4. Therefore, the voltage at plus A is greater than at plus B, and the connection signal supplied to the position winding 63 of the position regulator will be supplied to the winding 63 with current flowing from plus A to plus B. This signal will act to speed up the motor 17 of the controlled conveyor by decreasing the voltage supplied by rectifier 90 to the field winding 93 of the generator 32.

As shown by FIGS. 8A—8C, when the controlled conveyor is ahead, the resultant vectors R1 and R2 are shorter than the vectors R3 and R4. The rectified voltage at plus A is now smaller than that at plus B so that correction signal applied to the position winding 63 will flow from plus B to plus A, and will act to slow down the motor 17 of the controlled conveyor by increasing the voltage supplied by rectifier 90 to the field winding 93 of the generator 32.

The position regulator 64 is a feed-back control system. A basic system of this type determines when an error exists, and amplifies the resultant signal to provide proper corrective action.

Reference voltage from the rectifier 70 for error signal limitation is also applied to the position winding 63 of the position regulator. The slider 71 on the resistor 69 in the supply circuit to this rectifier permits this reference voltage to be adjusted by an operator.

The position regulator also has a voltage winding 72 connected to the resistor 76 across the exciter 31, and receives from the exciter, reference voltage for the speed regulator. The slider 75 on the resistor 76 can be adjusted by an operator.

The position regulator also has an IR component winding so connected across the series field winding 82 of the generator 32, and receives a small signal providing for load compensation.

The windings 86 and 87 of the position regulator are power windings of the magnetic amplifier forming a part of the position regulator. They apply an A.C. signal to the rectifier 90 which is changed to full-wave D.C. and applied to the field winding 93 of the generator 32 for controlling its output voltage.

The bias winding 100 of the position regulator receives from the rectifier 103, a fixed excitation that is adjustable for establishing the output of the magnetic amplifier. The bias signal cuts the magnetic amplifier off when no other control signals are present.

The damping windings 93 of the position regulator stabilize the regulator to prevent over correction, and also provide damping for reducing the tendency to hunt, and provide smooth starting and acceleration of the drive.

FIG. 9 shows the locations of the various windings of the position regulator, as wound on two transformer cores C1 and C2. The position regulator itself is conventional and with its various feed-back circuits has been used for other purposes. See, for example, U.S. Patent No. 2,748,329.

The error signal applied to the position winding 63 is amplified and applied through the magnetic amplifier windings 86 and 87 to the field winding of the generator 52 to change the excitation of the generator in the proper direction to bring the controlled conveyor motor 17 driven by it back to its reference position.

The rectifier 70 applies a D.C. reference voltage across the position winding 63 of the position regulator. This voltage limits the error signal so that the controlled conveyor cannot be speeded up by more than 5%–10% above normal operating speed.

The transformer secondary windings 115 and 116 connected to the rectifier 112, and the similar windings 117 and 118 connected to the rectifier 114 supply voltages which are added vectorially and rectified by the rectifiers 112 and 114 for application to the relay coils 111 and 113, respectively. When the controlled conveyor is stopped for a sufficient period of time for the position error to approach one-half job length, the master conveyor must be stopped also. For normal operation without any position error, the voltage added are directly in phase, and the coils 111 and 113 have equal voltages applied reversely thereto so that their effect on their common armature is equal and the contacts 33 remain closed. However, as the position error gets larger, the voltage vectors begin to differ in phase by an amount equal to the position error with respect to the one-half job length point. At 175° position error, the relay 110 is adjusted to drop out so that its contacts 33 open the energizing circuit of the motor 12 of the master conveyor. A change of 1° changes the voltages applied to the relay by 20%, which makes possible a very sharp relay setting. Also, the system is least sensitive to charges in the magnitude of the supply voltage when the two vectors are in direct opposition as used herein. Supply voltage variations are balanced out leaving phase displacement as the principal determinate for the values of voltage supplied to the relay.

The synchroscope 120, which is connected to the supply circuits of the relay 110, gives visual indication of the conveyor error.

While the master synchro 14 has been illustrated and described as being driven by a master conveyor, it could, of course, be otherwise driven, as by a clock, for providing reference positions.

While but one controlled conveyor has been illustrated and described, in some systems, more than one controlled conveyor would be used and controlled as described in the foregoing.

We claim as our invention:

1. A control system for a conveyor driven by an electric motor comprising a first synchro having a rotor driven by said motor, a master synchro having a rotor, means for driving said master synchro rotor at a substantially constant speed, said synchros having multiphase primary windings connected together for connection to a common A.C. source, and having two-phase secondary windings, four transformers, each having a primary winding connected to one of said secondary windings, said transformers each having two secondary windings, rectifiers connected to said transformer secondary windings so as to supply two, two-phase, full-wave D.C. voltages, one of which is larger than the other when said rotor of said first synchro is ahead of said rotor of said master synchro, and the other of which is larger than said one voltage when said rotor of said first synchro is behind said rotor of said master synchro, a position control winding connected to said rectifier so that D.C. current flows in one direction through said control winding when said one voltage is larger than said other voltage, and that D.C. current flows in the other direction through said control winding when said other voltage is larger than said one voltage, and means including said control winding for adjusting the speed of said motor for causing said rotors to rotate in synchronism.

2. A control system for synchronizing a first conveyor driven by one electric motor with a master conveyor driven by a second electric motor, said second motor having an energizing circuit, comprising synchros having rotors driven by said motors, said synchros respectively having polyphase primary windings connected together for connection to a common A.C. source and having secondary windings, phase comparison means for comparing vectorially the voltages in said secondary windings to produce an error voltage, and means using said error voltage for disconnecting said second motor from said circuit when said error voltage exceeds a predetermined value.

3. A control system for a conveyor having a D.C. driving motor, comprising a synchro having a rotor driven by said motor, a master synchro having a rotor, means for driving said master synchro rotor at substantially a constant speed, with each of said synchros having primary windings connected together for connection to a common A.C. supply source and having at least two secondary windings, phase comparison means for comparing vectorially the voltages in said secondary windings to produce an error voltage, a magnetic amplifier having a position winding and an output winding, means for supplying a D.C. voltage proportional to said error voltage across said position winding, and a D.C. generator connected to said motor, said generator having a field winding connected to said output winding, and means for providing a D.C. reference voltage across said position winding for limiting the effect of said first mentioned D.C. voltage applied across said position winding.

4. A control system for a conveyor driven by an electric motor comprising a first synchro having a rotor driven by said motor, a master synchro having a rotor, means for driving said master synchro rotor at a substantially constant speed, said synchros having multiphase primary windings connected together for connection to a common A.C. source, and having two-phase secondary windings, four transformers, each having a primary winding connected to one of said secondary windings, said transformers each having two secondary windings, rectifiers connected to said transformer secondary windings so as to supply two, two-phase, full-wave D.C. voltages, one of which is larger than the other when said rotor of said first synchro is ahead of said rotor of said master synchro, and the other of which is larger than said one voltage when said rotor of said first synchro is behind said rotor of said master synchro, a position control winding connected to said rectifier so that D.C. current flows in one direction through said control winding when said one voltage is larger than said other voltage, and that D.C. current flows in the other direction through said control winding when said other voltage is larger than said one voltage, and means including said control winding for adjusting the speed of said motor for causing said rotors to rotate in synchronism, said motor being a D.C. motor, and said means for adjusting the speed of said motor including a magnetic amplifier having a core on which said control winding is wound, said core having an output winding thereon, and further including a D.C. generator connected to drive said motor, said generator having a field winding connected to said output winding.

5. A control system for a conveyor driven by an electric motor comprising a first synchro having a rotor driven by said motor, a master synchro having a rotor, means for driving said master synchro rotor at a substantially constant speed, said synchros having multi-phase primary windings connected together for connection to a common A.C. source, and having two-phase secondary windings, four transformers, each having a primary winding connected to one of said secondary windings, said transformer each having two secondary windings, rectifiers connected to said transformer secondary windings so as to supply two, two-phase, full-wave D.C. voltages, one of which is larger than the other when said rotor of said first synchro is ahead of said rotor of said master synchro, and the other of which is larger than said one voltage when said rotor of said first synchro is behind said rotor of said master synchro, a position control winding connected to said rectifier so that D.C. current flows in one direction through said control winding when said one voltage is larger than said other voltage, and that D.C. current flows in the other direction through said control winding when said other voltage is larger than said one voltage, and means including said control winding for adjusting the speed of said motor for causing said rotors to rotate in synchronism, said motor being a D.C. motor, and said means for adjusting the speed of said motor including a magnetic amplifier having a core on which said control winding is wound, said core having an output winding thereon, and further including a D.C. generator connected to drive said motor, said generator having a field winding connected to said output winding, and means including a reference voltage source provided for limiting the current flowing through said control winding.

6. A control system for a conveyor driven by an electric motor comprising a first synchro having a rotor driven by said motor, a master synchro having a rotor, means for driving said master synchro rotor at a substantially constant speed, said synchros having multiphase primary windings connected together for connection to a common A.C. source, and having two-phase secondary windings, four transformers, each having a primary winding connected to one of said secondary windings, said transformers each having two secondary windings, rectifiers connected to said transformer secondary windings so as to supply two, two-phase, full-wave D.C. voltages, one of which is larger than the other when said rotor of said first synchro is ahead of said rotor of said master synchro, and the other of which is larger than said one voltage when said rotor of said first synchro is behind said rotor of said master synchro, a position control winding connected to said rectifier so that D.C. current flows in one direction through said control winding when said one voltage is larger than said other voltage, and that D.C. current flows in the other direction through said control winding when said other voltage is larger than said one voltage, and means including said control winding for adjusting the speed of said motor for causing said rotors to rotate in synchronism, and means including a reference voltage source provided for limiting the current flowing through said control winding.

7. A control system for synchronizing a conveyor driven by a D.C. motor with a master conveyor driven by an A.C. motor, said D.C. motor being driven by a D.C. generator having a field winding, said A.C. motor being driven by an A.C. source, comprising synchros having rotors respectively driven by said motors, said synchros having input windings connected together for connection to a common A.C. source, and having secondary windings, voltage phase comparison means for comparing vectorially the voltages in said secondary windings to produce an error voltage, voltage providing means for providing a D.C. voltage proportional to said error voltage, and control means for supplying said D.C. voltage to said field winding, with said D.C. motor being connected to said generator through first and second relay contacts of first and second relays, respectively, said contacts being connected in parallel, said relays having energized windings connected in series with said generator and D.C. motor so as to respond to current drawn by said D.C. motor, one of said relays being a timed relay arranged to hold its contacts closed at a higher overload current than the other relay opens its contacts for a timed period after said D.C. motor is started, and then at the end of said period opening its contacts independently of the current flowing through its energizing winding.

8. In motor control apparatus operative with an alternating current supply source and first and second motors, the combination of a first synchro device having a rotor driven by said first motor, a second synchro device having a rotor driven by said second motor, with each of said synchro devices having primary windings connected to said alternating current supply source and having secondary windings, phase comparison means for comparing vectorially the voltages in said secondary windings to provide an error voltage, a motor control device responsive to said error voltage for providing a control voltage proportional to said error voltage, said control device being operatively connected to one of said first and second motors for controlling the operation of said one motor in accordance with the value of said control voltage, and voltage limiting means operatively connected to said motor control device for limiting the value of said control voltage.

References Cited in the file of this patent

UNITED STATES PATENTS

| | | |
|---|---|---|
| 1,899,550 | Beekman | Feb. 28, 1933 |
| 1,968,575 | Staege | July 31, 1934 |
| 1,987,720 | Staege | Jan. 15, 1935 |
| 2,114,859 | Schaelchlin | Apr. 19, 1938 |
| 2,569,287 | Burgwin et al. | Sept. 25, 1951 |
| 2,693,563 | Hunt | Nov. 2, 1954 |
| 2,748,329 | Allbert et al. | May 29, 1956 |
| 2,808,922 | Lutman | Oct. 8, 1957 |
| 2,843,005 | Jones | July 15, 1958 |
| 2,885,616 | Anger et al. | May 5, 1959 |
| 2,888,129 | Chapman | May 26, 1959 |